United States Patent [19]

Belhustede

[11] Patent Number: 4,729,545
[45] Date of Patent: Mar. 8, 1988

[54] HIGH PRESSURE RELIEF VALVE

[75] Inventor: Gerhard Belhustede, Herten-Disteln, Fed. Rep. of Germany

[73] Assignee: VEBA OEL Entwicklungs-Gesellschaft mbH, Gelsenkirchen, Fed. Rep. of Germany

[21] Appl. No.: 930,922

[22] Filed: Nov. 17, 1986

[30] Foreign Application Priority Data

Nov. 15, 1985 [DE] Fed. Rep. of Germany ....... 3540478

[51] Int. Cl.$^4$ .............................................. F16K 31/44
[52] U.S. Cl. ..................................... 251/229; 251/88; 251/267
[58] Field of Search ........................... 251/229, 267, 88

[56] References Cited

U.S. PATENT DOCUMENTS

| | | | |
|---|---|---|---|
| 2,050,042 | 8/1936 | Davis | 251/229 |
| 2,866,477 | 12/1958 | Bredtschneider et al. | |
| 2,930,571 | 3/1960 | Vogl | 251/267 |
| 4,047,695 | 9/1973 | Cleveland et al. | |
| 4,337,788 | 7/1982 | Seger | |
| 4,338,961 | 7/1982 | Karpenko | 251/229 |
| 4,346,728 | 8/1982 | Sulzer | 251/229 |

FOREIGN PATENT DOCUMENTS 796582 4/1936 France .................................. 251/229

*Primary Examiner*—A. Michael Chambers
*Attorney, Agent, or Firm*—Oblon, Fisher, Spivak, McClelland & Maier

[57] ABSTRACT

A high pressure relief valve including a housing, an applied spring assembly, a valve seat with a seat opening, a valve poppet, a valve stem, a C-bracket, and an adjusting drive. The valve is intended for pressure relief of liquid hot-separator product which may contain solid components in the form of ash, catalyst, and unreacted coal components. The hot-separator product may be, in particular, a product of the hydrogenative liquefaction of coal. To obtain improved service life of the parts subject to wear, as well as to obtain good control characteristics and a tight valve closure, the valve has the following characteristics: (a) the throttle gap between the valve seat (10) and the valve poppet (11) is in the form of a surface gap between two broad-surfaced (or shallow-surfaced) bodies; (b) an excursion of the valve poppet (11) is produced by actuation of the adjusting drive (4); and (c) the excursion of the adjusting drive (4) is converted into rotary motion of a stem nut (3), which latter motion is converted to a lesser (i.e., geared down) prescribed linear motion of the valve stem (2) via an interior screw or worm part.

4 Claims, 1 Drawing Figure

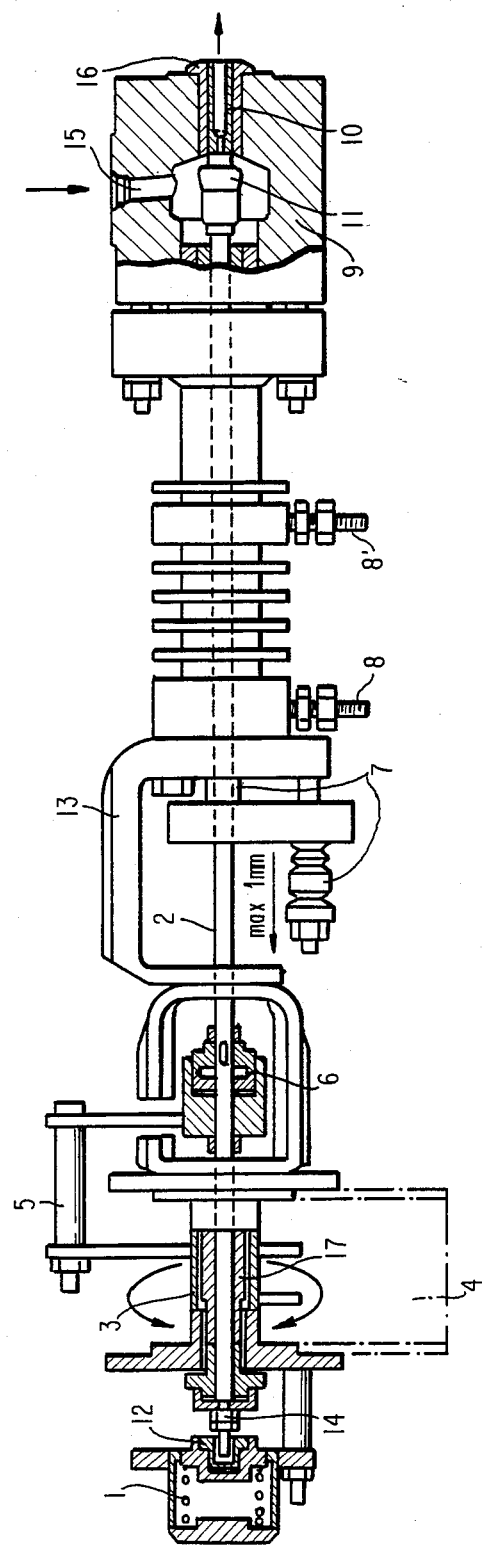

HIGH PRESSURE RELIEF VALVE

FIELD OF THE INVENTION

The invention relates to a short excursion, high pressure relief valve for use in corrosive environments.

BACKGROUND OF THE INVENTION

The area of application of the subject high pressure relief valve is preferably that of relieving the pressure on the hot-separator product of the hydrogenative liquefaction of coal. This product contains solid components in the form of ash, catalyst, and unreacted coal components. The pressure relief valve is provided to lower the pressure from up to 700 bar to a lower, intermediate level or to normal pressure. Such hot-separator residues are produced at temperatures between about 380° and 480° C., and the required depressurization from operating pressure to the lower pressure results in the residue's causing substantial abrasive wear and/or appreciable corrosion of parts of the high pressure relief valve exposed to them. Such wear and/or corrosion is due to the high flow speeds which develop, to the changes of flow direction which occur in the high pressure relief valve, and to the abrasive characteristics of the solid components of the hot-separator residues. The affected valve parts are particularly the valve poppet, the valve seat, the valve stem, miscellaneous housing parts of the valve, and the seat bore of the valve seat with the adjoining pipe running into the pressure relief container.

As a rule, the valve seat inserts are comprised of abrasive-resistant hard materials, and they may be provided as replaceable parts.

It has been found that exponentially high wear occurs in connection with degasification and evaporation of the hot-separator residue depressurized from operating pressure to the relief pressure, due to substantial acceleration of solid particles as well as liquid particles, in the presence of hydrogen. Because of the presence of hydrogen, the flow directions of such particles may be up to 180° against the general flow direction.

A pressure relief valve for slurries, e.g., is the subject of Eur. OS No. 0 085 251.

OBJECT OF THE INVENTION

The principal object of the present invention is to devise a high pressure relief valve with improved service life of the parts subject to wear, along with good control characteristics and a tight valve closure.

SUMMARY OF THE INVENTION

This object is attained according to the invention in the following manner:

(a) the throttle gap between the valve seat and the valve poppet is in the form of a surface gap between two broad-surfaced (or shallow-surfaced) bodies;

(b) excursion of the valve poppet is produced by actuation of the control drive; and (c) the excursion of the control drive is converted into rotary motion of a stem nut, which latter motion is converted to a lesser (i.e., geared down) prescribed linear motion of the valve stem via an interior screw or worm part.

By configuring the throttle gap between the valve seat and the valve poppet as a surface gap between two broad-surfaced (or shallow-surfaced) bodies, the operational wear on these critical locations of the valve is greatly reduced, due to the substantially decreased specific surface loading by hot-separator residue which contains abrasive solid components. The maximum flow through the valve in the open position of the high pressure relief valve is determined only by the diameter of the seat opening.

The subject high pressure relief valve is preferably in the form of a short excursion valve. In particular, the maximum flow is preferably attained with an excursion of at most about 1 mm.

To employ such a valve as a control with the control variable being, e.g., the level of the contents in the hot-separator vessel, which it is desired to keep constant during a hydrogenative coal-liquefaction process, the aforesaid maximum excursion of at most about 1 mm must be adjustable to a few hundredths of a millimeter.

The excursion movement, which, e.g., may be generated as a set-point quantity via a membrane sensor, in known fashion, is converted into the given excursion of the valve poppet of at most about 1 mm. Accordingly, excursion movements of 40 mm are typical.

A refinement of the subject high pressure relief valve includes means of adjusting the valve poppet toward the valve seat so as to take into account slowly progressing abrasive wear. Such means may be in the form of a stem-coupling comprising releasable fixing elements—e.g., a nut and lock or means having similar action.

Production of a very short excursion of the valve poppet (namely, at most about 1 mm) with adjustability to ±1% is provided for in a further refinement of the subject high pressure relief valve by means of a swinging shaft drive mounted laterally on a bracket or the like, wherewith the stroke, which is sent from the membrane sensor, is, e.g., first converted into a rotary motion by a helical ball bearing unit, and then the rotary motion is geared down to produce the linear movement of the stem of the valve poppet.

An excursion of a range of about, e.g., at least 25 mm is produced by means of an adjusting drive (which drive may be in the form of a pneumatic, electrical, or hydraulic stroking drive). This excursion may be converted into the required rotary motion by means of the adjusting drive via roller bearings. The rotary motion of a stem nut, which has an interior screw or worm part which operates with virtually no play and is affixed to the valve stem is thus geared down to produce a defined linear motion of the valve stem. Although in the presently preferred embodiment of the subject high pressure relief valve in the form of a short excursion valve the available excursion is limited to 1 mm, a control ratio of 1:20 is achieved, so that a sufficient control range is available.

In a further refinement of the subject high pressure relief valve, designed for additional reduction of the effects of wear due to local stressing of the valve poppet and valve seat, the rotary motion of the stem nut is coupled to an adjusting ratchet. Accordingly, each time the valve setting is changed (i.e., each time the valve stem is moved axially), the stem (and the poppet with it) is rotated, so that the wear concentrated on points of the poppet, which wear is caused by solids, is distributed over the entire perimeter of the valve poppet.

In a further refinement of the subject high pressure relief valve, the cone angle of the valve poppet is greater than 90°, preferably being in the range of 120° to 170°. Thus the valve poppet and the suitably matching valve seat are preferably obtuse angled when considered from the direction of the seat opening.

The fact that the valve poppet is obtuse angled does not exclude the possibility that the apex region of the valve poppet can be an acute angled cone, with such angle being substantially smaller than the aforementioned obtuse cone angle, whereby the apex projects outwardly. This apex configuration is relatively short, however, and makes no contact with the valve seat or the walls of the seat opening. Consequently, the apex makes no contribution to the sealing or throttling action of the valve. The purpose of the apex is to influence the flow conditions in this region.

By configuring the throttle contour as a surface gap between two broad-surfaced (or shallow-surfaced) bodies, and by embodying the high pressure relief valve as a short excursion valve, one can reach the open or closed positions of the valve in a relatively short time, which in itself leads to a substantial reduction in the rate of wear, because wear is greatly accelerated during times when the valve is only partially open.

The subject high pressure relief valve provides advantageous means of minimizing the rate of wear, wherewith the minimization of the excursion results in appreciable avoidance of a specially wear-intensive intermediate positions.

BRIEF DESCRIPTION OF THE DRAWING

A preferred (but non-limiting) embodiment of the subject high pressure relief valve is illustrated in the single figure.

DETAILED DESCRIPTION OF THE PRESENTLY PREFERRED EMBODIMENT

The presently preferred embodiment depicted in the single figure comprises a valve housing 9, a C-bracket 13, a control drive 4 in the form of a reversing unit comprising a stem nut 3, a carrier mechanism 5, and a rotary ratchet 6. With this high-pressure release valve, the distance of two plane parallel surfaces is finely regulated in a distance of up to 1 mm with a very high definition in the adjustment area. The adjustment is given by the lateral swinging of the control drive 4 on the stem nut 3.

The stem nut 3 has a spherical thread, operated free from play, with an inside screw or worm part 17 that is solidly connected to a valve stem 2. The lateral swinging by the control drive 4 thus is performed by the stem nut 3 in a rotation and by the inside screw or worm part 17 in a lifting movement of the valve stem 2 which is rigidly connected to the screw or the worm part.

The valve stem 2 is provided above the stem nut 3 and the screw or worm part with a fixing mechanism 14, which at the same time acts as an adjusting device. The fixing mechanism 14 has the function of compensating for the wear of a valve seat 10 and a valve poppet 11 by adjustment of the valve stem 2 and thus of the valve poppet 11. As a result, the process pressure, which acts on the valve stem 2 and the valve poppet 11, is opposed, and a tight process closure is obtained by the high-pressure relief valve.

For support of the control drive 4, a spring assembly 1 is applied to the valve stem 2 under pressure by a roller bearing 12. The spring assembly 1 is prestressed to the extent the process pressure occurring in the valve housing 9 requires.

The carrier mechanism 5 is connected to the ratchet 6. The rotary ratchet 6 is fastened by its inside part to the valve stem 2 and has the task of twisting the valve stem 2 during the lifting movement—i.e., simultaneously with a swinging of the control drive 4, the rotary ratchet 6, and thus of the valve stem 2 in the axial direction. This compensates for point wear marks on the valve seat 10 and on the valve poppet 11, so that as long as possible a uniform wear pattern is present and a tight process closure is guaranteed.

A spring-loaded detent bushing 7 with a control stud 8 and a flushing stud 8' is so designed that two detent bushing parts are placed in the corresponding part of the valve housing 9. The two detent bushing parts seal independently of one another. Due to the spring prestressing, the two detent bushing parts always apply equal sealing force to the sealing elements. This is particularly important, first because of the different process pressures that occur and second because of the thermal expansion in this part of the valve housing 9. The inside sealing element is the spring-loaded detent bushing 7 itself.

As sealing material, high pressure and temperature stable media such as pure graphite, graphite asbestos, and graphite silk packings are suitable. The control stud 8 is placed so that it can be checked between the two detent bushing elements to determine to what extent the lower detent bushing still has sealing properties. Accordingly, the flushing stud 8' and the stem guide in the valve housing 9 are always kept free with small amounts of flushing oil, as a result of which it is to be guaranteed that no product with a solid portion is drawn into the detent bushing area, which would considerably reduce the service life of the detent bushing.

The valve housing 9 forms, inter alia, the valve seat 10 which, for example, is designed as an inserted cartridge with inside inserted hard material parts. The valve poppet 11, which is screwed on the valve stem 2, is, for example, also armored with hard material parts. For example, a hard material part as a flat poppet is placed in the poppet part as a replaceable insert. The two parts, the valve seat 10 and the valve poppet 11, are so designed that they support the tangential funnel-shaped inflow through an inflow duct 15 in the valve housing 9. A substantially completely uniform eddy current around the discharge opening of a discharge duct 16 contributes to an evenness of the wear on the two throttle parts—namely, the valve seat 10 and the valve poppet 11.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A high pressure relief valve comprising:
   (a) a valve housing (9) containing a valve seat (10);
   (b) a valve poppet (11) located in said valve housing (9) and sized, shaped, and positioned to valve said valve seat (10), said valve poppet (11) having a non-actuated rest position spaced from said valve seat (10) by a throttle gap in the form of a surface gap between two broad-surfaced body;
   (c) a valve stem (2) projecting from said valve poppet (11);
   (d) means (1) for biasing said valve poppet (11) towards its non-actuated rest position; and (e) a drive for adjusting the non-actuated rest position of said valve poppet (11) relative to said valve seat (10), said drive comprising:
  (i) an inside screw or worm part that is solidly connected to said valve stem (2);
  (ii) a stem nut (3) operatively engaging said inside screw or worm part;
  (iii) a control drive (4) operatively connected to said stem not (3) to rotate said stem nut (3) relative to aid valve stem (2), thereby causing said valve stem (2) to move axially;
  (iv) a rotary ratchet (6) fastened by its inside part to said valve stem (2); and
  (v) a carrier mechanism (5) connecting said stem nut (3) to said rotary ratchet (6),
whereby actuation of said control drive (4) causes rotary motion of said stem nut (3), thereby causing axial motion of said valve stem (2), and rotary motion of said rotary ratchet (6), thereby simultaneously causing rotary motion of said valve stem (2) to compenstate for point wear marks on said valve seat (10) and said valve poppet (11).

2. A high pressure relief valve according to claim 1 wherein:
  (a) the maximum distance between said valve poppet (11) when in its non-acutated rest position and said valve seat (10) is 1 mm and
  (b) the non-actuated position of said valve poppet (11) is adjustable by said drive to a fineness of about ±1%.

3. A high pressure relief valve as recited in claim 1 wherein said valve poppet (11) has a valving cone angle of between 120° and 170°.

4. A high pressure relief valve according to claim 3 wherein:
  (a) said valve poppet (11) has an apex having a cone angle that is less than the valving cone angle and
  (b) when said valve poppet is in its closed position, said apex is disposed in said valve seat (10), but said apex does not make contact with said valve seat (10).

* * * * *